(12) United States Patent
Kim

(10) Patent No.: US 7,044,022 B2
(45) Date of Patent: May 16, 2006

(54) VARIABLE INERTIA FLYWHEEL APPARATUS

(75) Inventor: Tae Ik Kim, Suwon (KR)

(73) Assignee: Hyundai Motor Company, Seoul (KR)

( * ) Notice: Subject to any disclaimer, the term of this patent is extended or adjusted under 35 U.S.C. 154(b) by 302 days.

(21) Appl. No.: 10/742,326

(22) Filed: Dec. 18, 2003

(65) Prior Publication Data
US 2005/0050984 A1    Mar. 10, 2005

(30) Foreign Application Priority Data
Sep. 9, 2003   (KR) .................. 10-2003-0063072

(51) Int. Cl.
F16F 15/14   (2006.01)
F16C 15/00   (2006.01)

(52) U.S. Cl. ............... 74/574.2; 74/572.2; 74/571.11; 74/573.11

(58) Field of Classification Search ............. 74/574.2, 74/5 R, 570–574
See application file for complete search history.

(56) References Cited

U.S. PATENT DOCUMENTS

| 1,085,443 | A | * | 1/1914 | Lanchester | 74/572.2 |
| 4,002,086 | A | * | 1/1977 | Reinhall | 74/573.11 |
| 5,490,436 | A | * | 2/1996 | Coyne et al. | 464/180 |
| 2003/0178972 | A1 | * | 9/2003 | Burstall | 322/4 |

FOREIGN PATENT DOCUMENTS

JP        02-046344     2/1990

* cited by examiner

*Primary Examiner*—Richard W. Ridley
*Assistant Examiner*—Justin Krause
(74) *Attorney, Agent, or Firm*—Morgan Lewis & Bockius LLP

(57) ABSTRACT

In a flywheel having variable inertia, first and second guide grooves are respectively formed at a body and a rotatable member such that an overlapping position thereof is varied according to a relative rotation thereof. A movable mass is disposed at the overlapping position, and the rotatable member rotates relatively to the body by hydraulic pressure.

6 Claims, 5 Drawing Sheets

VARIABLE INERTIA FLYWHEEL APPARATUS

CROSS-REFERENCE TO RELATED APPLICATIONS

This application claims priority of Korean Application No. 10-2003-0063072, filed on Sep. 9, 2003, the disclosure of which is incorporated fully herein by reference.

FIELD OF THE INVENTION

Generally, the present invention relates to a variable inertia flywheel apparatus. More particularly, the present invention relates to a variable inertia flywheel apparatus for enhancement of the performance and fuel consumption characteristics of an engine by varying a rotational inertia of the flywheel during operation of the engine.

BACKGROUND OF THE INVENTION

An internal combustion engine produces power by converting combustion pressure formed in a cylinder to rotational torque of a crankshaft. The combustion pressure in the cylinder is time variant depending on crank angle. That is, an output torque of the crankshaft (i.e., engine torque) is not constant and it fluctuates depending on the crank angle. Therefore, in order to prevent unstableness of the engine torque, a flywheel is mounted to an end of the crankshaft.

When a mass of the flywheel is increased, acceleration characteristics of the engine deteriorate. To the contrary, when the mass of the flywheel is reduced, the engine torque may become unstable. In this respect, the rotational inertia of a flywheel is designed such that acceleration characteristics of an engine and stabilization of engine torque are appropriately compromised.

An optimal compromised point may vary depending on engine speed. Therefore, when a flywheel is designed such that inertia of the flywheel is increased at a low engine speed so that an engine operation is stabilized, and the inertia is decreased at a high engine speed so that performance of the engine is enhanced, it may promise simultaneous achievement of stabilization of engine operation and an increase in fuel mileage.

The information disclosed in this Background of the Invention section is only for enhancement of understanding of the background of the invention and should not be taken as an acknowledgement or any form of suggestion that this information forms the prior art that is already known in this country to a person of ordinary skill in the art.

SUMMARY OF THE INVENTION

Embodiments of the present invention provide a variable inertia flywheel apparatus having non-limiting advantages of efficiently varying its rotational momentum inertia.

An exemplary variable inertia flywheel apparatus according to an embodiment of the present invention includes a body, a rotatable member, a movable mass, and a hydraulic pressure supply unit.

The body is fixed to an end of a crankshaft, and the body has a plurality of first guide grooves formed in a principally radial direction. The body has a wall formed in a radial direction between a pair of the first guide grooves.

The rotatable member is assembled with the body for forming first and second pressure chambers divided by the wall, and the rotatable member has a plurality of second guide grooves corresponding to the first guide grooves. An overlapping position of the first and second guide grooves varies on a relative angle of the rotatable member to the body.

The movable mass is inserted between the first and the second guide grooves at an overlapping position of the first and second guide grooves.

The hydraulic pressure supply unit selectively supplies hydraulic pressure to the first pressure chamber and second pressure chamber.

In a further embodiment, the first guide grooves are helically formed.

In another further embodiment, an exemplary variable inertia flywheel apparatus according to an embodiment of the present invention further includes a solenoid valve disposed on first and second hydraulic lines connected to the first and second pressure chambers, and an electronic control unit for controlling the solenoid valve for selectively supplying hydraulic pressure to the first and second pressure chambers.

In a yet another further embodiment, the movable mass is bar-shaped.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Figure 1:
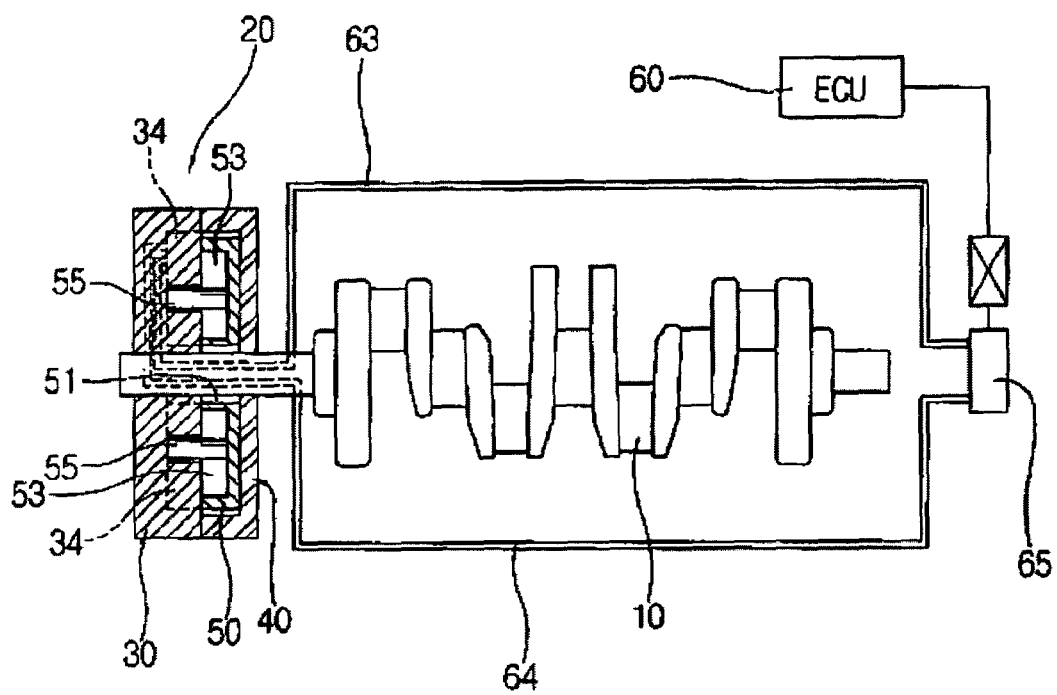
FIG. 1 is a sectional view of a variable inertia flywheel apparatus mounted to an engine according to an embodiment of the present invention.
Figure 2:
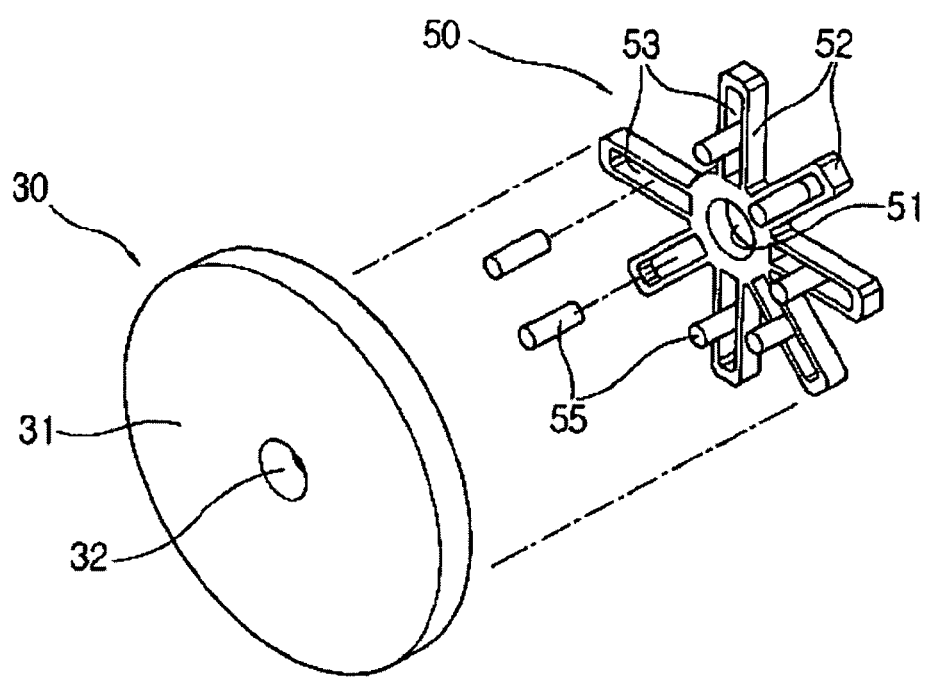
FIGS. 2 and 3 are exploded views of a variable inertia flywheel according to an embodiment of the present invention.

An embodiment of the present invention will hereinafter be described in detail with reference to the accompanying drawings.

Reference number 20 in the drawings indicates a variable inertia flywheel according to an embodiment of the present invention, and reference number 10 indicates a crankshaft for mounting the variable inertia flywheel 20 according to an embodiment of the present invention. The flywheel 20 is fixed to an end of the crankshaft 10, and includes a body 30, a cover 40, and a rotatable member 50.

The body 30 has a circular plate 31 of a predetermined size. The body 30 has a shaft-receiving hole 32 at its center, and an end of the crankshaft 10 is inserted into the shaft-receiving hole 32. In addition, a wall 33 (FIG. 3) is projected on an interior side of the body 30. The wall 33 is aligned in a radial direction of the body 30. When the body 30 is assembled with the rotatable member 50, the wall 33 divides one of chambers formed by rails 52 of the rotatable member 50, and thereby forms a first pressure chamber 61 and a second pressure chamber 62.

Figure 3:
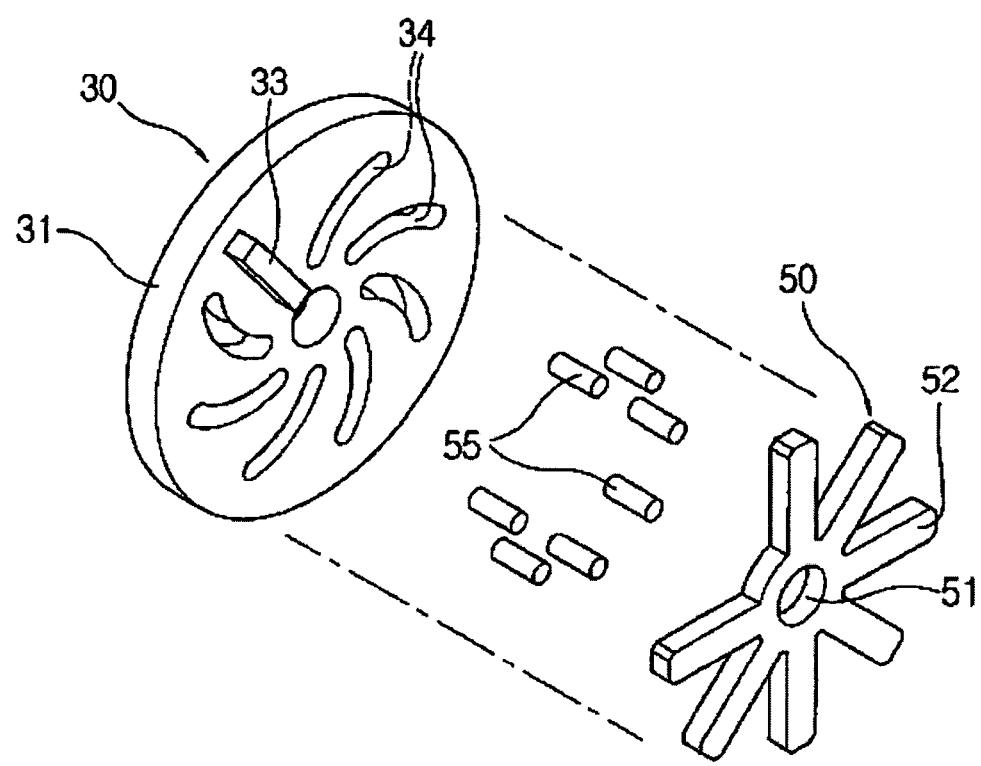

A plurality of first guide grooves 34 are formed at the body 30. The first guide grooves 34 are formed in a principally radial direction that almost converges to the shaft-receiving hole 32. The wall 33 is disposed between an adjacent pair of first guide grooves 34. The first guide grooves 34 are not perfectly linear in the radial direction of the body 30. As shown in FIG. 3, they are helically (or spirally) formed.

As shown in FIG. 1, when assembled, the cover 40 forms a space with the body 30, and the rotatable member 50 is contained in the space between the body 30 and the cover 40.

The rails 52 of the rotatable member 50 radially project, and they are spaced with approximately the same spacing as the first guide grooves 34 formed at the body 30. A second guide groove 53 is formed inside each of the rails 52 in correspondence with the first guide groove 34. Preferably, the second guide grooves 53 are linearly formed, differently from the first guide groove 34.

The rotatable member 50 is rotatably mounted to the crankshaft 10 by a mounting hole 51, and the body 30 and the cover 40 fixed on the crankshaft 10 integrally rotate with the crankshaft 10.

An area is formed at an overlap of the first and second guide grooves 34 and 53, and a bar-shaped movable mass 55 is inserted through this area. That is, the movable mass 55 is inserted to a position (referred to as "overlapping position" hereinafter) at which the first guide groove 34 overlaps (or intersects) the second guide groove 53.

When the rotatable member 50 rotates relative to the body 30, the overlapping position of the first and second guide grooves 34 and 53 varies in the radial direction, and thereby the position of the movable mass 55 also varies. That is, the rotational inertia of an assembly of the body 30, the rotatable member 50, and the movable mass 55 are variable.

In order to supply hydraulic pressure to the first pressure chamber 61 and the second pressure chamber 62, as shown in FIG. 1, first and second hydraulic lines 63 and 64 are respectively connected to the first and second pressure chambers 61 and 62 are formed in the crankshaft 10 and the body 30.

The first and second hydraulic lines 63 and 64 receive hydraulic pressure from an oil pump (not shown) of the engine. A solenoid valve 65 is disposed between the oil pump and the first and second hydraulic lines 63 and 64, and the solenoid valve 65 controls hydraulic pressure supply to the first and second pressure chambers 61 and 62 under the control of an electronic control unit (ECU) 60. ECU 60 may comprise a processor and other associated hardware and software or firmware as may be selected and programmed by a person of ordinary skill based on the teachings contained herein.

That is, a high oil pressure is selectively supplied to the first or second pressure chambers 61 or 62 in accordance with an operation of the solenoid valve 65. Accordingly, the oil pressure pressures either of rails 52 positioned left and right of the wall 33, and thereby the rotatable member 50 receives a rotational torque. As described above, when the rotatable member 50 rotates relatively to the body 30, the position of the movable mass 55 varies.

When the engine is started and the crankshaft starts its rotation, the body 30 and the cover 40 rotate integrally with the crankshaft 10. The ECU 60 controls the solenoid valve 65 in accordance with an operational state of the engine such as an engine speed.

When the solenoid valve 65 is operated by the ECU 60 and accordingly a hydraulic pressure is supplied to the first or second hydraulic line 63 or 64, correspondingly the first or second pressure chamber 61 or 62 receives the hydraulic pressure and accordingly the rotatable member 50 rotates.

When the engine is driven at a low speed, the ECU 60 controls the solenoid valve 65 such that the movable mass 55 is outwardly moved, and therefore, sufficient rotational inertia of the flywheel is achieved.

When the engine is driven at a high speed, the ECU 60 controls the solenoid valve 65 such that the movable mass 55 is inwardly moved, and therefore, the rotational inertia of the flywheel is reduced such that an acceleration characteristic of the engine is enhanced.

Figure 4:
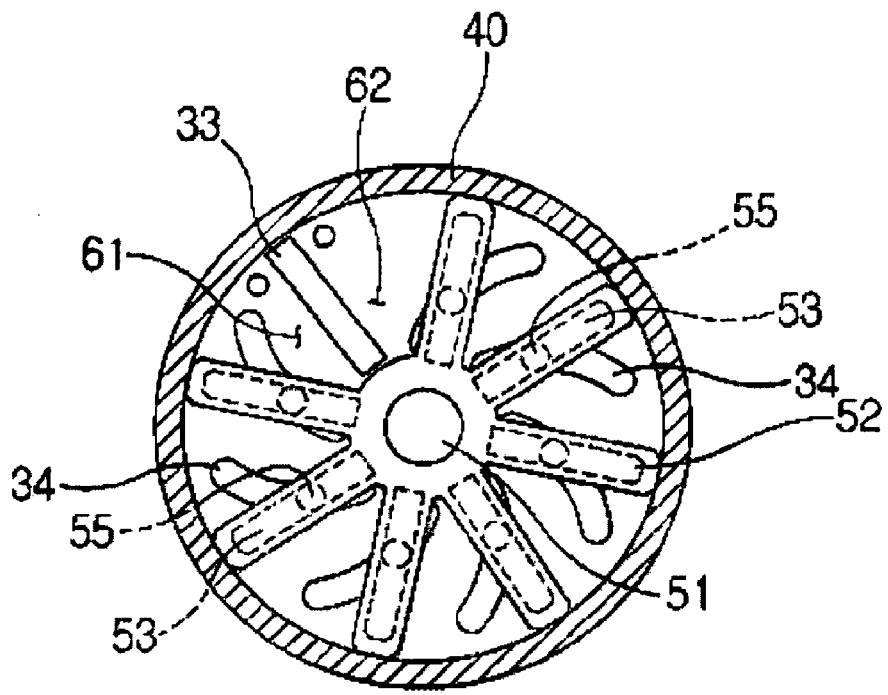
FIG. 4 is a lateral view of a variable inertia flywheel according to an embodiment of the present invention.
Figure 5:
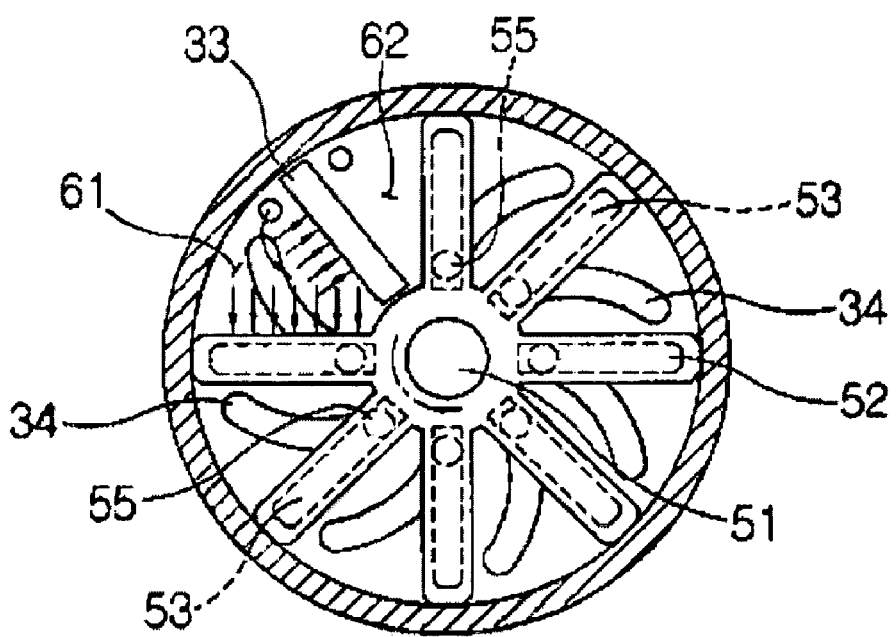
FIGS. 5 and 6 illustrate operation of a variable inertia flywheel according to an embodiment of the present invention.
Figure 6:
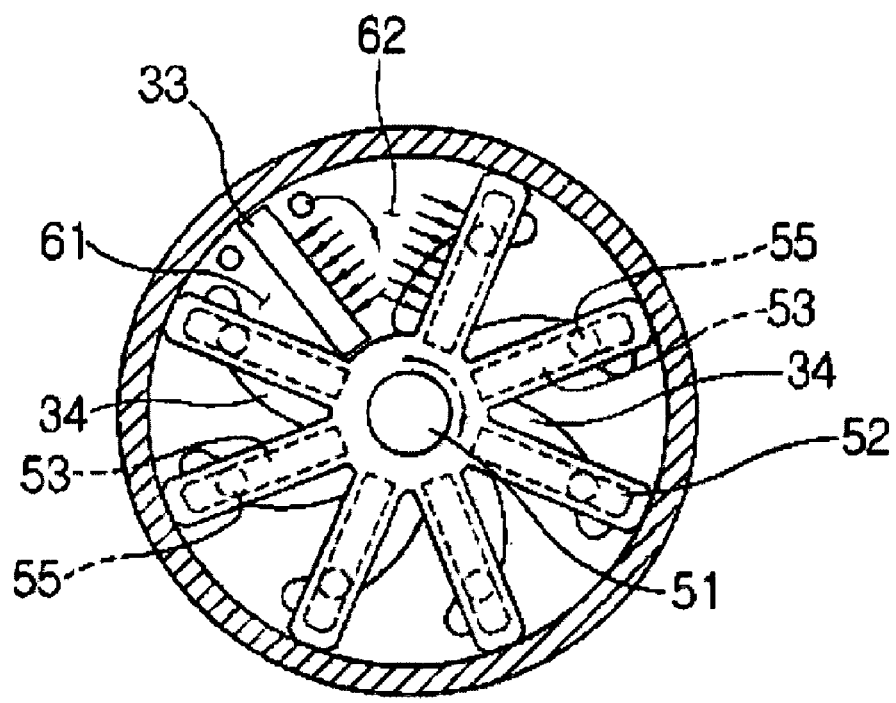

That is, as shown in FIGS. 4 and 5, the rotatable member 50 rotates corresponding to an operational state of the engine, and accordingly the movable mass 55 moves outward or inward. That is, the flywheel is controlled such that the rotational inertia thereof is varied appropriately for the operational state of the engine, and stability of engine operation is achieved at a low speed and fuel mileage is enhanced at a high speed.

As described above, according to an embodiment of the present invention, rotational inertia of a flywheel mounted to an end of a crankshaft is varied appropriately to an operational state of an engine. Therefore, stability of engine operation and enhancement of fuel mileage is achieved.

In addition, according to an embodiment of the present invention, such a variable inertia flywheel is efficiently structured for varying of its inertia.

While this invention has been described in connection with preferred embodiments, it is to be understood that the invention is not limited to the disclosed embodiments, but, on the contrary, is intended to cover various modifications and equivalent arrangements included within the spirit and scope of the appended claims.

What is claimed is:

1. A variable inertia flywheel apparatus, comprising:
   a body fixed to an end of a crankshaft, the body having a plurality of first guide grooves formed in a principally radial direction, the body having a wall formed in a radial direction between a pair of the first guide grooves;
   a rotatable member assembled with the body for forming first and second pressure chambers divided by the wall, the rotatable member having a plurality of second guide grooves corresponding to the first guide grooves, an overlapping position of the first and second guide grooves varying on a relative angle of the rotatable member to the body;
   a movable mass inserted between the first and the second guide grooves at an overlapping position of the first and second guide grooves; and
   a hydraulic pressure supply unit for selectively supplying hydraulic pressure to the first pressure chamber and second pressure chamber.

2. The variable inertia flywheel apparatus of claim 1, wherein the first guide grooves are helically formed.

3. The variable inertia flywheel apparatus of claim 1, wherein the first guide grooves are slanted with respect to the radial direction.

4. The variable inertia flywheel apparatus of claim 1, further comprising:
   a solenoid valve disposed on first and second hydraulic lines connected to the first and second pressure chambers; and
   an electronic control unit for controlling the solenoid valve for selectively supplying hydraulic pressure to the first and second pressure chambers.

5. The variable inertia flywheel apparatus of claim 1, further comprising:
   a solenoid valve disposed on first and second hydraulic lines connected to the first and second pressure chambers; and
   an electronic control unit for controlling the solenoid valve for selectively supplying hydraulic pressure to the first and second pressure chambers,
   wherein the first guide grooves are helically formed.

6. The variable inertia flywheel apparatus of claim 1, wherein the movable mass is bar-shaped.

* * * * *